Jan. 20, 1942.   R. H. CLARKE   2,270,581
REVERSE GEAR AND CONTROL
Filed Nov. 6, 1939   5 Sheets-Sheet 1

Inventor
ROBERT H. CLARKE
by
Loudmin & Loudmin
Attorneys

Jan. 20, 1942. R. H. CLARKE 2,270,581
REVERSE GEAR AND CONTROL
Filed Nov. 6, 1939 5 Sheets-Sheet 2

Inventor
ROBERT H. CLARKE
by Toulmin & Toulmin
Attorneys

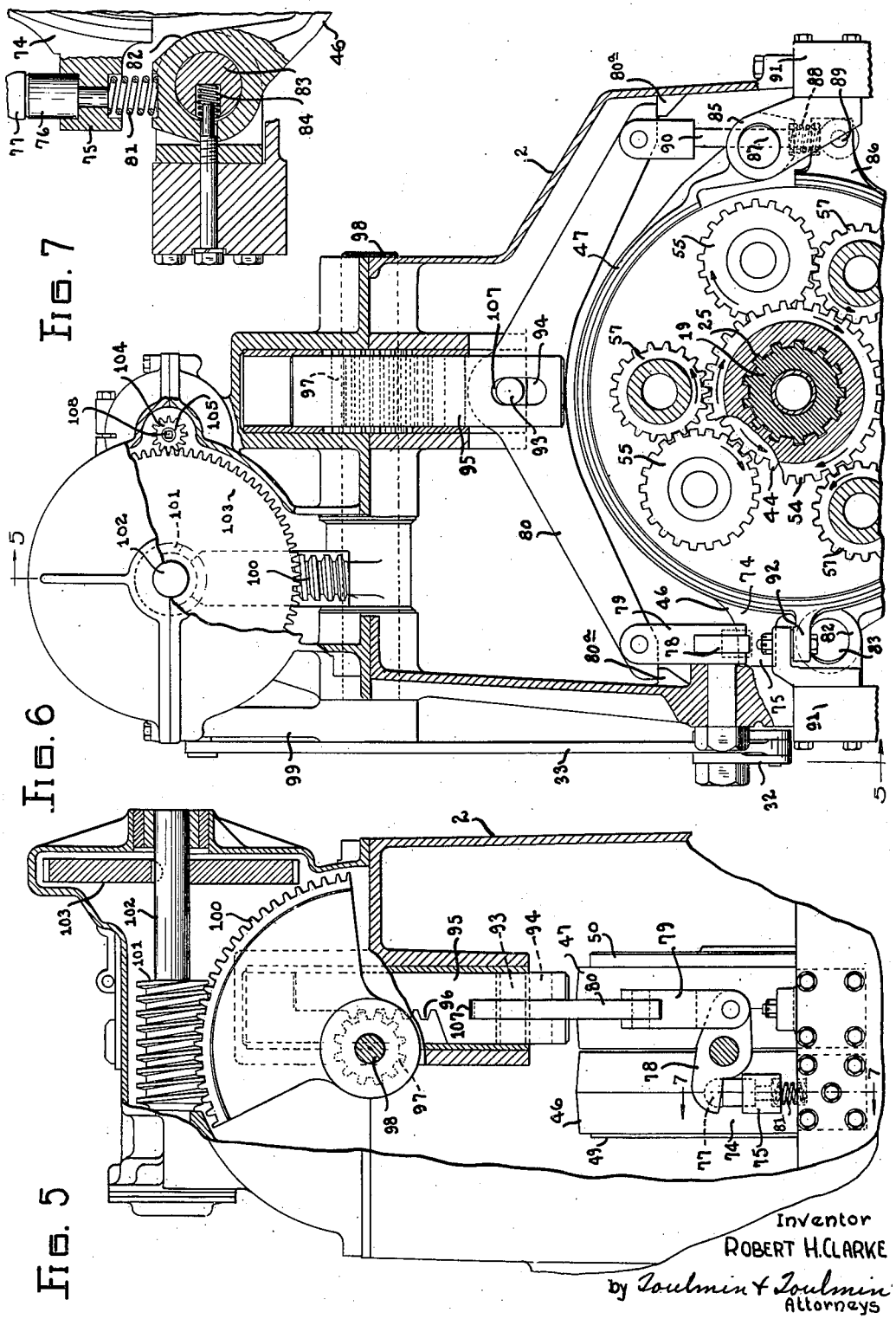

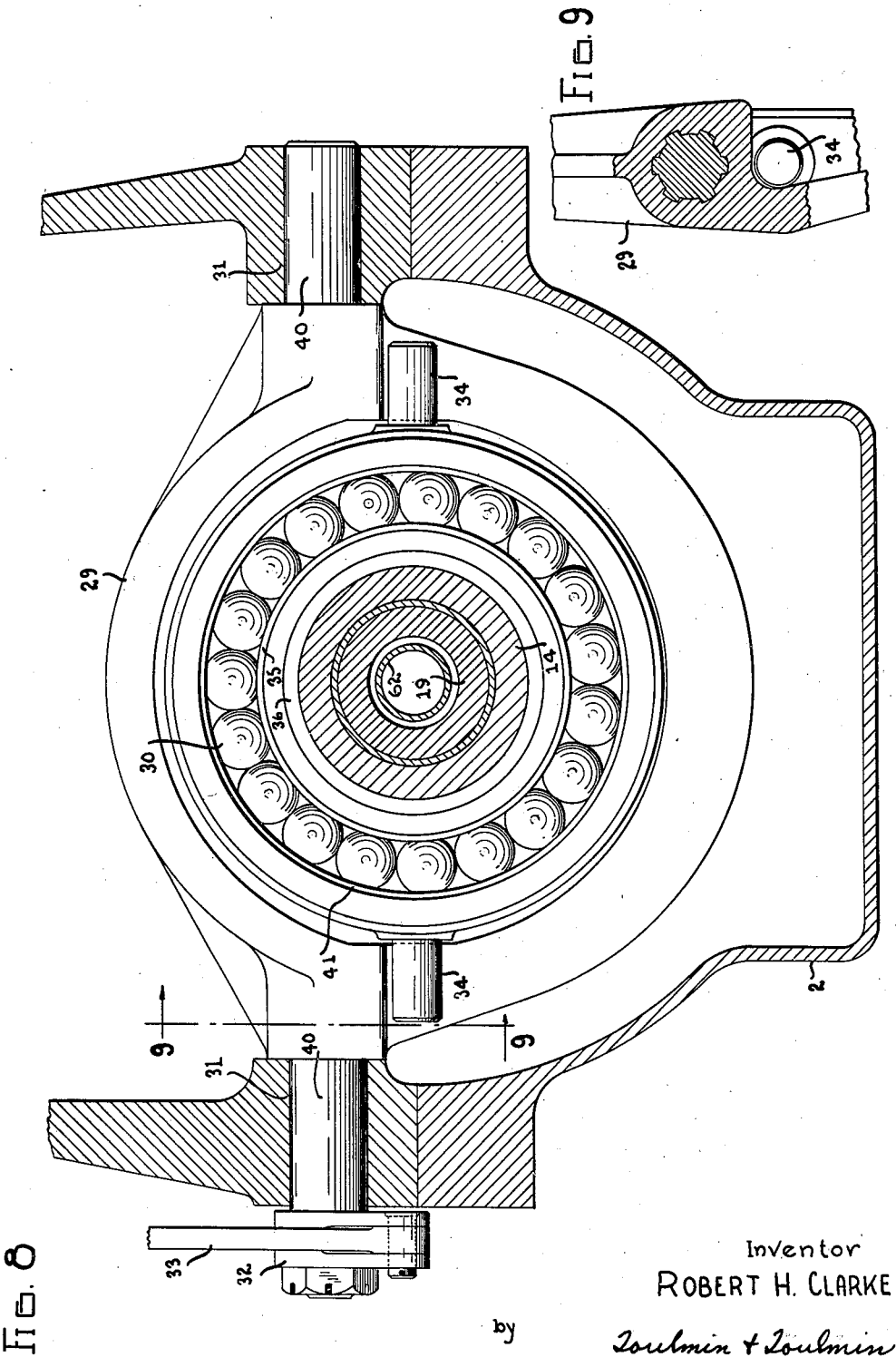

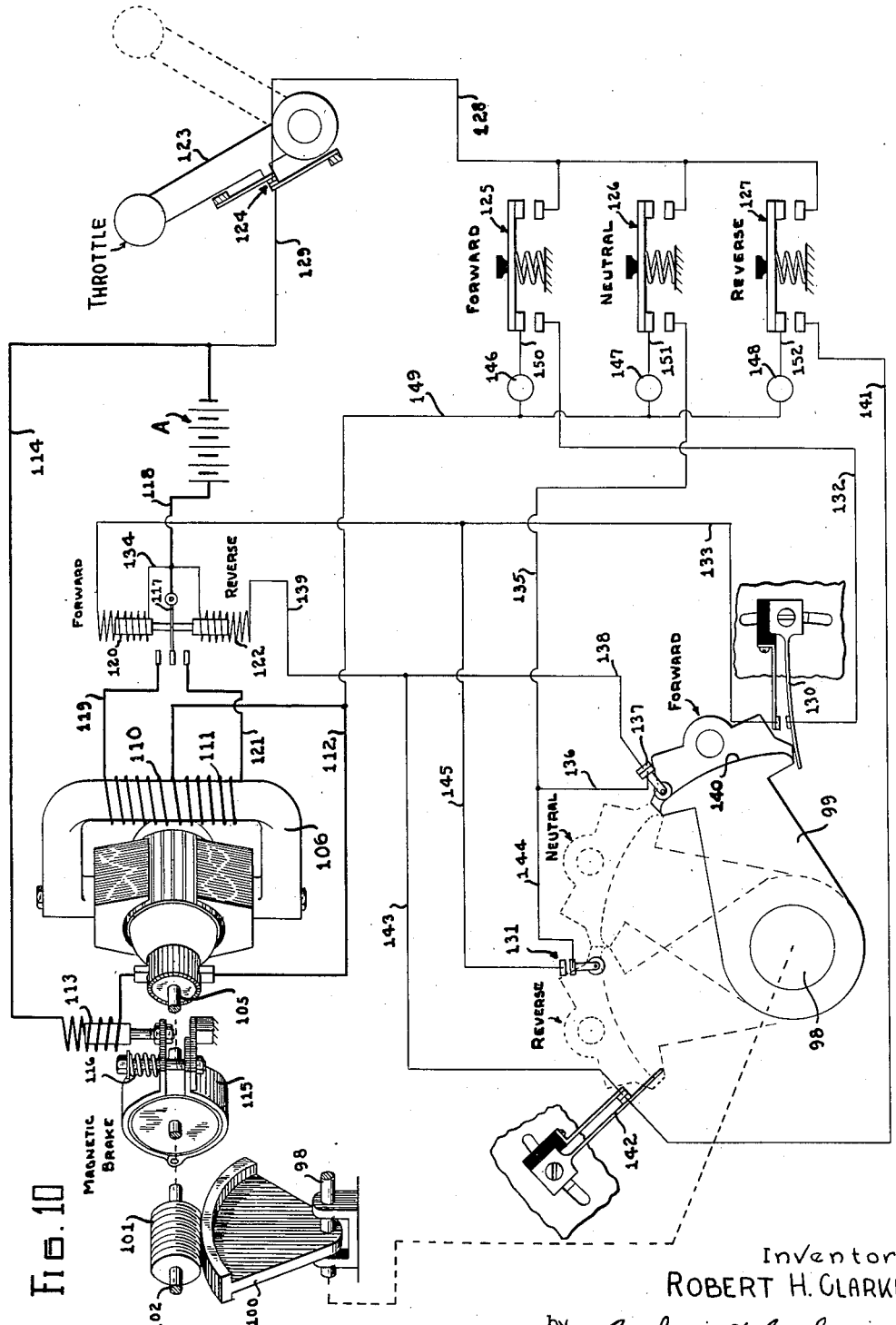

Patented Jan. 20, 1942

2,270,581

UNITED STATES PATENT OFFICE 2,270,581

REVERSE GEAR AND CONTROL

Robert H. Clarke, Madison, N. J.

Application November 6, 1939, Serial No. 303,014

5 Claims. (Cl. 74—298)

This invention relates to a reversing gear and to a control therefor. While in its more particular aspect, the invention relates to a reversing unit and control adapted for use between a marine engine and the propeller driven thereby, it is to be understood that it is not limited to such application and that it is of general application wherever it is desired to interpose a reversing unit between a driving unit and a driven member, which is to be operated in either a forward or a reverse direction at will.

The principal object of this invention is to devise a reversing unit which is capable of allowing either forward or reverse operation of the driven unit, as a propeller of a marine vessel; the device of the present invention enables rapid shifting from forward to reverse operation or vice versa, or from either forward or reverse operation to neutral or vice versa; the present invention makes possible a more compact, more efficient and more convenient reversing unit than has been heretofore available; in addition, the unit may be economically constructed, since it is designed with a view to convenient assembly; at the same time, the unit is very sturdy and long-lived, thereby eliminating a large maintenance cost.

Another object is to provide a reversing unit which comprises a clutch and a brake assembly, the clutch assembly being engaged for forward operation, and the brake assembly being engaged for reverse operation; preferably, the design is such that for forward operation the clutch is engaged and the brake is disengaged, for neutral operation both the brake and clutch are disengaged, and for reverse operation the clutch is disengaged while the brake is engaged.

Another object is to provide an assembly of the foregoing type wherein the mechanism associated with the brake is of the planetary gear type, being free to rotate orbitally when the unit is in forward or neutral gear; the mechanism associated with the brake constitutes the reversing mechanism for operating the propeller shaft in the reverse direction.

Yet another object is to provide a reversing unit of the foregoing type wherein a single control member operates to shift the unit from any one of the three states of operation to any other of these states of operation.

Another object is to provide a reversing unit which is lubricated throughout in a simple and economical manner; the unit is adapted to be lubricated from the marine engine, or other engine which acts as the driving unit, and, by reason of the disposition of the several parts relative to one another and their construction, thorough lubrication of every working part is made possible without wasting lubricant.

Still another object is to provide a reversing gear of the type set out above wherein in forward operation, the brake is disengaged and the brake drum with its contained planetary gearing rotates as a unit at the same speed and in the same direction as the engine and propeller shaft, wherein in neutral, with the propeller shaft stationary but with the engine rotating, the brake drum rotates in the same direction by reason of the planetary gearing contained in the brake drum; when operating in reverse, the brake is engaged and the propeller shaft is rotated in the opposite direction by reason of the said planetary gearing contained with the brake drum.

Another object is to devise control mechanism for automatically shifting operation from any gear to any other gear; in a preferred embodiment, this control mechanism is electrical and by merely pushing on the desired push button, shifting is effected; also in a preferred embodiment the hand throttle controlling the driving engine is interlocked with the electrical shifting circuit in such manner that it is impossible to effect shifting unless the engine throttle is first closed.

Another object is to provide a magnetic brake operating upon the shifting motor shaft so as to instantaneously stop the shifting when the shift has been effected.

Another object is to provide switches, which are preferably adjustable, for stopping the movement of the shift member at the instant when shifting has been effected; preferably these limit switches are adjustable in order to compensate for clutch disk or brake band wear.

Still another object is to provide an external brake operating on the brake drum which comprises two brake bands which are disposed side by side on the brake drum and which are so formed that they are contracted into engagement with the brake drum by an upward pull on the opposite sides of the brake drum, thereby eliminating difficulties caused by the off center push of a single brake band which causes bending of the shaft and dislocation of all of the members which the shaft carries; in addition, the off center push of a single band causes increased bearing loading on the member braked; in a preferred embodiment, the brake actuating beam employed acts as an equalizer, resulting in both brake bands carrying exactly equal loads, and these equal loads act oppositely in such manner as to overcome the difficulties attendant upon use of a single brake band.

Still other objects will more fully hereinafter appear.

Referring to the accompanying drawings:

Figure 5 is a side elevation, partially cut away in order to show internal details of construction, showing the housing containing the clutch and brake actuating mechanism.

Figure 6 is a rear elevation, largely cut away, of the housing of Figure 5 and including in addition, a vertical sectional view of the brake mechanism, taken approximately along the line 6—6 of Figure 3 looking in the direction of the arrows, with the outer half of the brake drum removed in order to show clearly the relative disposition of the gears contained inside of the brake drum.

Figure 7 is a vertical sectional view taken on the line 7—7 of Figure 5, looking in the direction of the arrows.

Figure 8 is a detailed view partly in section, of the mounting of the clutch throw out yoke and clutch throw out mechanism.

Figure 9 is a sectional view on the line 9—9 of Figure 8, looking in the direction of the arrows.

Figure 10, is a schematic view of the control mechanism employed in conjunction with the reversing unit.

Figure 1:
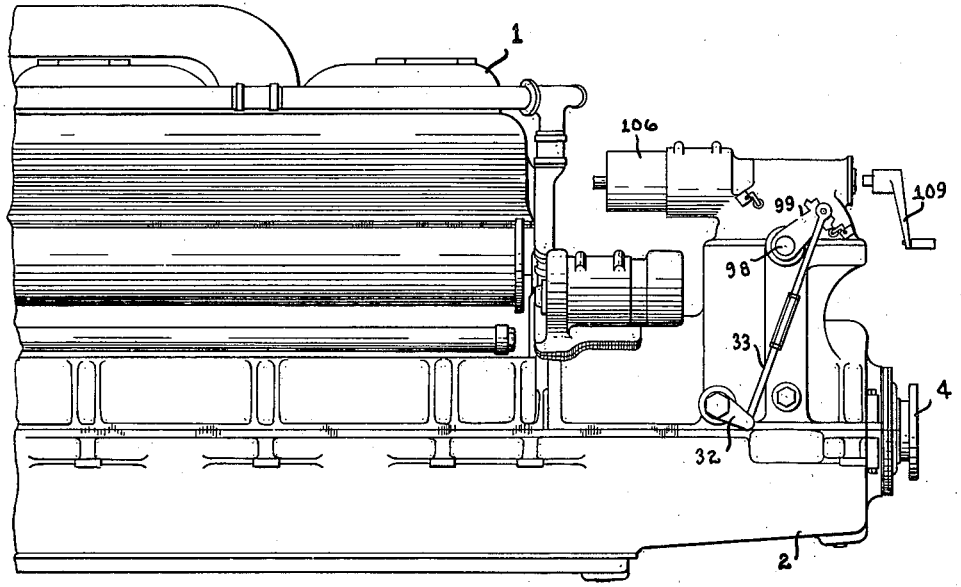
Figure 1 is a vertical elevation of a marine engine, to the rear of which is integrally attached the reversing unit of the present invention.

Referring to the drawings in detail, reference numeral 1 designates generally an internal combustion engine of any suitable type, to the rear end of which is attached a housing 2 which contains the reversing unit of the present invention. The rear end of the crank shaft of the engine 1 is provided with a rearwardly extending flange 3 of the usual type and the reversing unit is mounted in axial alignment with crank shaft flange 3. At the rearward end of the reversing unit, reference numeral 4 designates a propeller shaft flange to which the propeller drive shaft may be secured in any desired manner. The reversing unit of the invention is interposed between driving flange 3 and driven flange 4 so that the rotation of flange 4 relative to the rotation of flange 3 may be controlled by the unit of the present invention.

Fixedly attached to crank shaft flange 3 as by bolts 6 is a flywheel 5 which is provided with a toothed starter ring 7 of usual type. Flywheel 5 is journaled in a ball bearing 8 mounted in the rear end of engine housing 9. Fixedly mounted at the rear of flywheel 5, as by means of bolts 10, is an integral clutch housing designated generally as 11, which comprises a rearwardly extending portion 12, an inwardly extending portion 13 and a portion 14 extending rearwardly and of substantially smaller diameter than 12.

Within clutch housing 11 are a plurality of clutch disks which comprise alternate clutch disks 15 toothed on their outer periphery and clutch disks 16 toothed on their inner periphery. The inward face of clutch housing portion 12 is provided with longitudinal teeth 17 which are adapted to be slidably engaged by the teeth 18 on the outer periphery of clutch disks 15. Rotatably mounted within clutch housing 11 is a hollow shaft 19 which is provided with an integral outwardly extending circular portion 20. Shaft 19 extends longitudinally through the reversing unit to a point inside of propeller shaft flange 4. Shaft 19 is journaled in a journal bearing 22 provided centrally of flywheel 5, and is thereby free to rotate relative to flywheel 5. The outward portion 20 of hollow shaft 19 is provided on its outer periphery with longitudinally extending teeth 21 which are adapted to slidably engage the teeth 23 provided on the inner peripheral edge of clutch disks 16.

A circular plate 24 is provided at the rear of the inside of clutch housing 11, and the outer peripheral portion of this plate 24 is adapted to push clutch disks 15 and 16 together against flywheel 5 to thereby cause clutch housing 11 to rotatably drive hollow shaft 19. In this way, propeller shaft flange 4, which is inwardly internally splined to correspond with splines on the rearmost end of hollow shaft 19, is driven forwardly at the same speed and directly with flywheel 5 and the crank shaft of engine 1.

Clutch actuating plate 24 is pressed inwardly so as to cause engagement of clutch disks 15 and 16 by springs 26, one end of which pushes against portion 13 of clutch housing 11 and the other end of which pushes against the forward end 27 of cups 28 suitably circularly disposed inside of portion 20 of hollow shaft 19.

The clutch actuating means is provided between clutch housing 11 and the brake and reversing assembly which will be described below. This clutch actuating means comprises a clutch throw out yoke 29 which surrounds a clutch throw out ball bearing 30 which in turn surrounds rearwardly extending portion 14 of clutch housing 11. Yoke 29 is fixedly attached to stub shafts 40 which are journaled in journals 31 on either side of the reversing unit and is thereby rotatably pivoted. Fixedly attached to the right stub shaft 40 is an actuating arm 32 which is connected pivotally to an upwardly extending rod 33 which in turn is connected to the controlling unit which will be described more fully below. Upon pushing downwardly upon rod 33, throw out yoke 29 is pivoted so as to allow springs 26 to force clutch engaging plate 24 forwardly, thereby effecting driving connection between clutch housing 11 and shaft 19. In order to accomplish this result, pins 34 extend outwardly from either side of the outer bearing cage 41 of ball bearing 30. These pins 34 are integrally attached to the bearing cage 41. The inner race 35 of bearing 30 is fixedly mounted in a journal 36 which slidably and rotatably surrounds portion 14 of clutch housing 11. Fixedly connecting plate 24 with journal 36 are a plurality of circularly disposed bolts 37. Mounted between plate 24 and journal 36 upon bolts 37 are spacers 38 which are slidably disposed in guiding holes 39. The result of the foregoing construction is that when yoke 29 is rotated in the direction indicated by the arrow A of Figure 3, pins 34 are allowed to move forwardly, thereby allowing plate 24 to engage clutch disks 15 and 16. And when yoke 29 is moved in the opposite direction, plate 24 is moved rearwardly, compressing springs 26 and thereby disengaging clutch plates 15 and 16. Preferably, in engaging the clutch, yoke 29 is moved forwardly until there is some clearance between it and pins 34 so that there will be no danger of slippage of clutch disks 15 and 16.

The rearward end of portion 14 of clutch housing 11 is journaled around hollow shaft 19 by a journal 42. Fixedly attached to clutch housing 11 as by means of bolts 43, is a gear 44 which rotates with flywheel 5. Gear 44 is journaled around shaft 19 by a journal 45 which allows free rotation therebetween. Gear 44 is externally toothed as indicated and operates when the unit is in reverse or in neutral to control the action of the other gears in the brake and reverse assembly.

Figures 3, 4:
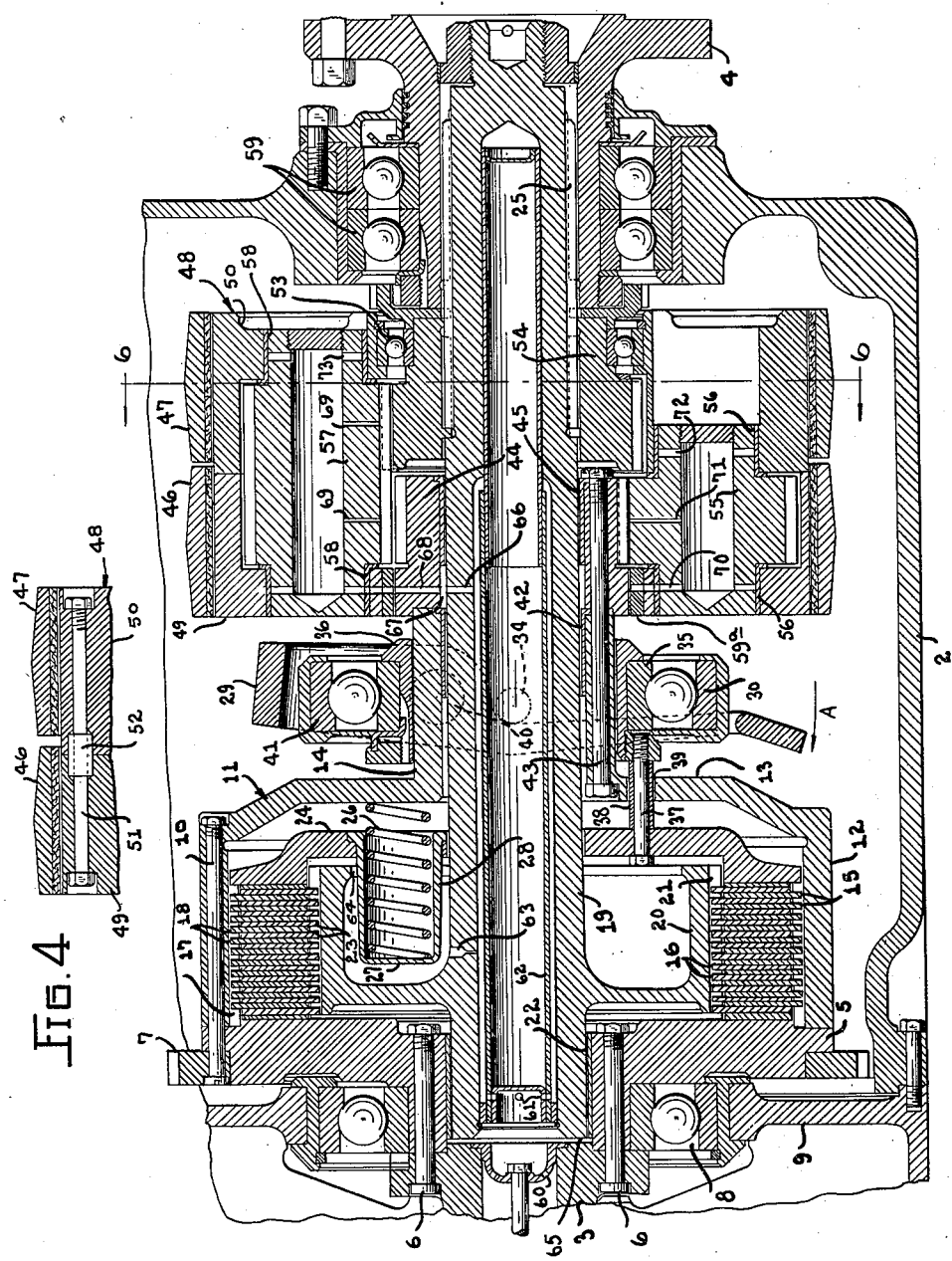
Figure 3 is a vertical sectional view through the reversing unit itself, showing the construction of the clutch, of the clutch actuating mechanism, of the brake unit, and of the gearing mounted therein.
Figure 4 is a detailed sectional view showing the manner in which the two halves of the brake drum and gear cage are joined together in assembly.

The reversing assembly is located between the throw out yoke 29 and the rear wall of housing 2, being disposed about the rearward portion of hollow shaft 19. It comprises stationary external brake bands 46 and 47 which surround a brake drum designated generally as 48. Brake drum 48 acts as a housing for the reversing unit itself and is made up of a forward half 49 and a rear half 50. These halves are held together as indicated in Figure 4 by bolts 51 provided with dowels or sleeves 52 which are slidable on bolts 51 and which are received in recesses in the adjacent surfaces of members 49 and 50. Preferably, these dowels are slightly shorter in length than the combined depth of the recesses so that there will be no danger of dowels 52 preventing close engagement of the adjacent surfaces of members 49 and 50. Dowels 52 prevent turning of halves 49 and 50 relative to one another. The construction shown facilitates assembly of the reversing unit proper.

Brake drum halves 49 and 50 are circular in form, extending inwardly, so as to support the several gears journaled therein and so as to be journaled with respect to shaft 19. Disposed approximately centrally of half 50 is a rear guide bearing 53 which is fixedly mounted surrounding a gear 54. Gear 54 is internally splined to correspond with and be received by the splines 25 on the rear end of shaft 19.

Disposed adjacent the forward end of the reversing unit proper is a plurality of pinions 55 which engage inwardly gear 44. These pinions 55 are journaled within journals 56 provided in the brake drum 48. Enmeshed with each of pinions 55 is a rearwardly extending pinion 57 journaled in journals 58. Pinions 57 are slightly smaller in diameter than pinions 55 and enmesh inwardly with gear 54 which is slightly larger in diameter than gear 44.

Propeller flange 4 is fixedly mounted in a double row ball bearing 59 which is provided in the rear wall of housing 2 and which supports and guides the entire unit at its rear. Bearing 59 further acts as a forward bearing for the propeller shaft which is attached to flange 4.

*Operation of the forward and reversing unit*

Figure 2:
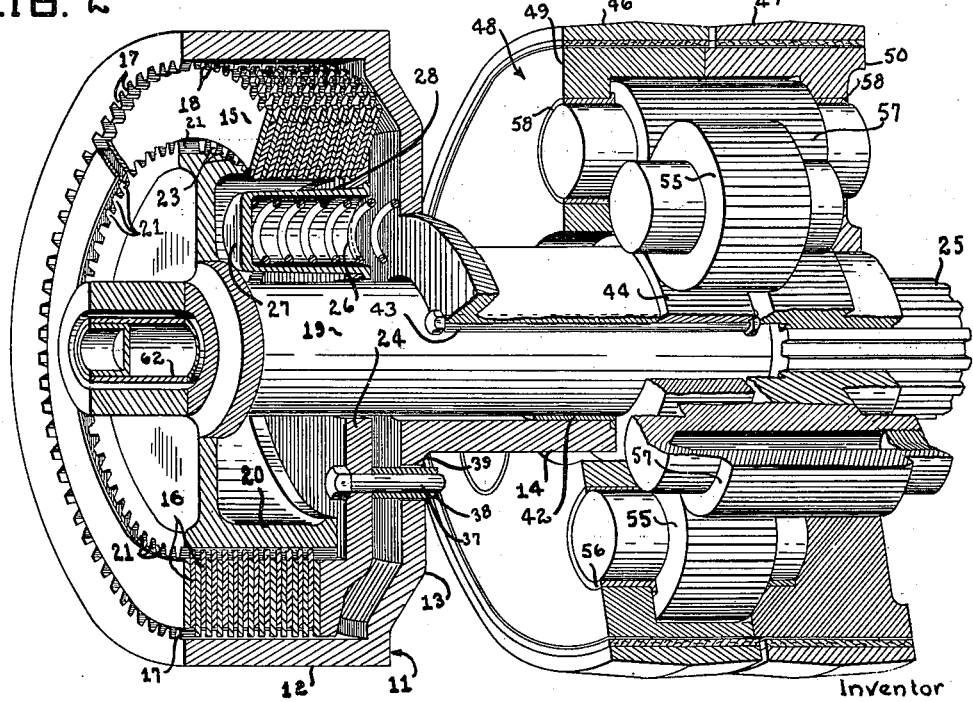
Figure 2 is a sectional perspective showing the internal construction of the clutch housing and of the brake unit which acts as a gear cage for the reversing unit.

In order to simplify the discussion, the operation of the forward and reversing unit will now be described. Assuming that the unit as shown in Figures 2 and 3 is in neutral, if it is desired to shift into forward and to have propeller shaft flange 4 rotated at the same speed and in the same direction as crank shaft flange 3, clutch throw out yoke 29 is moved in the direction of the arrow A, whereupon the springs 26 force plate 24 forwardly, causing clutch plates 15 and 16 to engage and drivingly connect clutch housing 11 with shaft 19 which is splined at its rearward portion to propeller shaft 4. Flywheel 5, clutch housing 11, shaft 19 and propeller shaft flange 4 then rotate as a unit. Since gear 44 is fixedly attached to the rear of clutch housing 11 and since gear 54 is fixedly splined to shaft 19, gears 44 and 54 will likewise rotate with shaft 19 in a counterclockwise direction, looking from the rear of the unit. When the shifting of clutch yoke 29 is effected, brake bands 46 and 47 which were disengaged in the neutral position, remain disengaged so that brake drum 48 is free to rotate relative thereto. Accordingly, since pinion 55 which is enmeshed with gear 44 attempts to rotate pinion 57 in a counterclockwise direction and since gear 54 at the same time attempts to rotate pinion 57 in a clockwise direction, pinions 55 and 57 are locked relative to one another and the brake drum 48 and pinions 55 and 57 all rotate as a unit in a counterclockwise direction at the same speed as shaft 19.

If now the clutch yoke 29 be shifted to disengage clutch disks 15 and 16 and to the neutral position, brake bands 46 and 47 are allowed to remain unclamped. Shaft 19 and propeller shaft flange 4 are now stationary. Gear 44 which is fixedly attached to clutch housing 11 rotates in a counterclockwise direction at the same speed as crank shaft flange 3. Since shaft 19 is stationary, gear 54 is likewise stationary. Gar 44 tends to rotate pinion 55 in a clockwise direction, and since a pinion 55 is enmeshed with pinion 57 which is enmeshed with stationary gear 54, the axis of pinion 55 is caused to revolve in a counterclockwise direction and to carry with it brake drum 48 and at the same time cause pinion 57 to revolve about gear 54 without turning on its own axis. Brake drum 48 will thus rotate at a speed less than the speed of engine 1 and which speed will be determined by the ratio between pinion 55 and gear 44.

Should it be desired to shift into reverse, clutch yoke 29 is left in the same position as it was when in neutral and brake bands 46 and 47 are clamped into engagement with brake drum 48, thereby causing brake drum 48 to become stationary. When this happens, gear 44 which is driven at the same speed as the engine drives pinion 55 which drives pinion 57 which drives gear 54 and thereby propeller shaft flange 4 at the same speed as the engine, but in the opposite direction, namely clockwise. The arrows on the gears at the lower portion of Figure 6 indicate the relative motion of the several gears and pinions when in reverse. While in reverse, shaft 19 and associated clutch disks 16 are rotated in a clockwise direction, but since clutch disks 15 and 16 are disengaged from one another, this does no damage. A journal 59a is provided between gear 44 and brake drum 49 so as to allow free relative rotation between them when operating in neutral or reverse.

*Lubrication of forward and reverse unit*

Oil from engine 1 is pumped under pressure rearwardly through the hollow central portion of crank shaft flange 3 through ports 60 and 61 between hollow shaft 19 and a tube 62 mounted inwardly of shaft 19. Oil from the annular space surrounding tube 62 passes outwardly through ports 63 and 64 in shaft 19, and thence obtains access to the clutch plates 15 and 16 which are kept thoroughly lubricated at all times. Oil passes outwardly through opening 65 to journal 22. Oil similarly passes outwardly through ports 66 to the reversing gears and pinions, first obtaining access through an annular channel 67 to journal 42, and thence outwardly through a port 68 to lubricate journals 58, and thence into the interior of hollow pinion 57 whence it is allowed to flow outwardly through radial ports 69 to lubricate the gear teeth of pinion 57. As gear 44 rotates, port 68 is brought into communication with a port 70 which allows oil to flow into the interior of hollow pinions 55 and thence to proceed radially outwardly through ports 71 to thereby lubricate the teeth of pinions 55. Ports 72 in pinions 55 lubricate the inward journals thereof. Ports 73 in pinions 57 lubricate the journals thereof. Oil from ports 68 lubricate journal 59a.

Brake engaging mechanism

Circular brake bands 46 and 47 are disposed with their ends on the opposite sides of the reversing unit. This is indicated in Figure 6. As previously indicated, these bands are disposed side by side on brake drum 48. One of the open ends 74 of band 46 is adapted to be pushed downwardly to thereby clamp the band 46 about drum 48 (see Figure 7). End 74 is provided with a lug 75 which is adapted to receive a cylindrical tappet 76 which is engaged by a sliding hemispherical ball 77 operating within a recess in the end of a pivoted rocker arm 78. Rocker arm 78 is connected by a link 79 to a common brake beam 80. Thus when brake beam 80 is pulled upwardly by means presently to be described, end 74 of band 46 is pushed downwardly to thereby clamp the band around the drum. Stops 80a limit downward movement of brake beam 80. A spring 81 is interposed between lug 75 and the pivoted opposite end 82 of band 46 so as to urge the ends of the band apart and to thereby disengage the band from the drum when brake beam 80 is lowered. End 82 of band 46 is pivoted about a fixed pivot 83. A spring 84 interposed between end 82 and pivot 83 normally urges end 82 outwardly away from drum 48. Thus, when end 74 is pushed towards end 82 against the action of spring 81, end 82 is forced inwardly against the action of spring 84, but when end 74 is released, spring 81 forces it away from end 82 while spring 84 forces end 82 horizontally outwardly away from the drum.

Brake band 47 is mounted with its open end at the right of Figure 6 and its pivoted end 85 mounted above its movable end 86. Pivoted end 85 surrounds a pivot pin 87 and is horizontally movable relative thereto in the same manner as described for end 74 for brake band 46, similarly being urged outwardly by a spring but being vertically immovable. The movable end 86 is normally forced away from end 85 by a spring 88, and a pin 89 passing through end 86 is engaged by a link member 90 which is mounted on the opposite end of brake beam 80. In this way, when brake beam 80 is pulled upwardly, both bands 46 and 47 are clamped into engagement with brake drum 48, brake band 46 being closed by a downward movement on the one side of the unit and band 47 being closed by an upward movement on the opposite side of the unit, thereby preventing the disadvantageous bending and dislocation of the unit referred to above. This result is accomplished both by the opposite engagement actions of bands 46 and 47 and by reason of their being located closely adjacent one another in a longitudinal direction. As will be obvious, pivot pins 83 and 87 are fixedly mounted with respect to housing 2 and may be mounted in a frame 91 or with respect to frame 91 so as to be immovable.

Opposite the closing end of each brake band 46 and 47, substantially 180° from the closing end, is a supporting lug 92. This lug 92 is shown in Figure 6 for brake band 47 and it will be understood that a similar lug is provided at the right hand of Figure 6 for brake band 46. This lug is fixedly mounted against vertical movement with respect to housing 2 and frame 91 in any suitable manner. The purpose of this supporting lug is to support the brake bands against the tendency of gravity to force them against the upper half of brake drum 48. Preferably lugs 92 are allowed to slide horizontally with respect to their supporting means toward and away from brake drum 48 so that the brake bands will not bind against any portion of brake drum 48 when the brake is released by releasing brake beam 80 downwardly.

Brake beam 80 is provided at its upper central portion with a horizontal longitudinally extending pin 93 which is carried in a pair of elongated slots 94 in a vertically sliding member 95. Member 95 is provided at its upward portion with a rack 96 which engages a pinion 97 mounted on a transversely extending shaft 98. Shaft 98 is journaled in the upward portion of housing 2, and rack member 95 is slidably journaled in this upper portion of housing 2. Shaft 98 is a common brake and clutch actuating shaft. Mounted on its rightward end, outside of housing 2 is an arm 99 which is connected to vertical arm 33 which actuates the clutch engaging and disengaging yoke 29. Shaft 98 is rotated by means of a fixedly mounted segmental worm wheel 100 engaged by a worm 101 which is mounted on a longitudinal shaft 102, on the rear end of which is fixedly mounted a gear 103 which is driven by a pinion 104 mounted on the shaft 105 of a shifting electric motor 106. As a result of the construction just described, when common shaft 98 is turned so as to push yoke 29 in the direction indicated by the arrow A of Figure 3, it allows brake beam 80 to lower, thereby allowing the brake to remain disengaged while the clutch plates 15 and 16 are engaged. As shaft 98 is rotated in a counter clockwise direction (Figure 5), clutch throw out yoke 29 is moved in the reverse direction so as to disengage the clutch. At the same time, rack member 95 is raised up but due to the lost motion connection brought about by elongated slots 94, it does not raise brake beam 80 so that the mechanism goes into neutral with both the clutch and brake units disengaged. As shaft 98 is rotated still further in a clockwise direction, clutch throw out member 29 is still further moved in a counterclockwise direction (Figure 3), but the bottom portion of slots 94 engages pin 93 and causes brake beam 80 to be moved upwardly, thereby applying the brakes to brake drum 48 and causing the mechanism to operate in reverse. Clearance 107 is preferably provided between pin 93 and the upper portion of slots 94 so that clutch disks 15 and 16 may be positively engaged before the top of slots 94 strikes pin 93.

Preferably, a square socket 108 is provided in the rear end of shaft 105 and a hand crank 109 with a square end is provided which is adapted to be pushed inwardly to rotate pinion 104 and to thereby effect shifting manually should the electric power be interrupted.

Control mechanism

The control mechanism is illustrated in Figure 10 and comprises a shifting electric motor 106 which is operative to shift the unit from any gear to any other gear by rotating shaft 98 in the proper direction to the proper extent. Motor 106 is a reversible motor, being provided with a forward winding 110 and a reverse winding 111. These windings have a common lead 112 which connects through the brushes of motor 106 and through a magnetic brake solenoid 113 to a lead 114 which connects to one side of battery A. A magnetic brake 115 is provided which is disengaged by current flowing through coil 113 whenever motor 106 is operating, but which is automatically applied to the shaft 105 of motor 106 by a spring 116.

The other side of battery A is connected by a lead 118 to a contact member 117 which is adapted to electrically connect lead 118 to lead 119 to forward winding 110 whenever current is passed through a forward relay coil 120. Contact member 117 is adapted to electrically connect lead 118 to a lead 121 leading to reverse winding 111 when relay coil 122 is energized.

Engine controlling throttle 123 is provided with a switch 124 which is connected to lead 114 and to one side of battery A. Throttle 123 is so arranged that switch 124 is closed only when throttle 123 is closed so that engine 1 is idling. In this way, motor 106 is prevented from being operated to shift the unit except when throttle 123 is closed and engine 1 is idling.

A forward switch 125, a neutral switch 126 and a reverse switch 127 are provided, all being connected to a lead 128 from throttle switch 124. When forward switch 125 is closed, assuming that throttle 123 is closed, current passes from battery A through leads 129 and 128 through a lead 132 to a limit switch 130 (which is closed because control arm 99 on shaft 98 is either in the reverse or neutral position), through a lead 133, thence through forward relay coil 120 and a lead 134 to lead 118 and back to battery A. The passage of current in this manner through coil 120 energizes forward relay 120, causing current to pass from lead 118 through contact arm 117, lead 119, forward coil 110, common lead 112, magnetic brake relay coil 113, and lead 114 back to battery A. This results in release of magnetic brake 115 and turning of shaft 98 in a clockwise direction as viewed in Figures 1, 5 and 10, thereby causing clutch plates 15 and 16 to be engaged. At the same time, arm 99 strikes limit switch 130, whereupon it breaks the forward relay circuit, causing contact arm 117 to break the current to forward winding 110 and causing magnetic brake 115 to be instantaneously applied so as to stop the shifting action.

If it is desired to shift from the forward gear thus attained into neutral, neutral switch 126 is pressed, causing current from battery A to flow through a lead 135, a lead 136, a switch 137, which is closed by reason of cam surface 140 on arm 99, and a lead 138 to a lead 139 to reverse relay coil 122, thereby causing switch contact arm 117 to move downwardly, thereby establishing a flow of current from battery A through reverse winding 111, causing brake relay 113 to release the magnetic brake 115 and motor 106 to operate in a reverse direction and thereby disengage the clutch by moving arm 99 into the intermediate dotted line position of Figure 10. Just as arm 99 approaches this intermediate position, its cam surface 140 disengages switch 137, thereby breaking the circuit through reverse relay coil 122 and causing the circuit to reverse motor winding 111 to be broken. Instantly, magnetic brake 115 is applied, causing the unit to be stopped when shifted into this neutral position.

Should it now be desired to shift into reverse, switch 127 is closed, causing current to pass through a lead 141 to a reverse limit switch 142 which is then closed, through a lead 143, through lead 139 to reverse relay coil 122, thereby causing motor 106 to rotate shaft 98 in a counterclockwise direction until arm 99 strikes limit switch 142, thereby breaking the relay circuit and causing shaft 98 to stop.

As arm 99 has moved into the leftward dotted line position of Figure 10, its cammed surface 140 has closed a switch 131 which is connected to lead 135 by a lead 144 and by a lead 145 to lead 133. The purpose of this switch 131 is to place the control mechanism in such condition that when either forward switch 125 or neutral switch 126 is operated, forward relay 120 will be energized so as to move shaft 98 out of reverse position into either the neutral or forward position, as desired. For example, assuming that the unit is in reverse, with arm 99 in the dotted line position at the extreme left of Figure 10, if neutral switch 126 is closed, current may pass through lead 135, lead 144, closed switch 131, lead 145, lead 133 to forward relay coil 120, thereby causing arm 99 to be moved in a clockwise direction. When arm 99 has attained the neutral position indicated by the intermediate dotted lines of Figure 10, its cammed surface 140 will open switch 131, thereby breaking the circuit to forward relay 120 and causing the unit to stop in the neutral position.

Assuming that the unit is in the reverse position indicated by the extreme leftward dotted lines in Figure 10 and that it is desired to shift into forward, switch 125 will be closed, allowing current to pass through lead 132, to limit switch 130, then closed, and lead 133 to forward relay coil 120 which will be energized until arm 99 has opened limit switch 130 at the extreme clockwise position of its travel indicated by the full lines in Figure 10.

It will be understood that in order to effect any of the shifting movements, it is necessary that throttle 123 be closed, so as to close switch 124, thus preventing shifting of gears except when motor 1 is idling.

In order to indicate to the operator when the desired shifting movement has been effected, so that he may release the shifting switch 125, 126, or 127, a set of indicating lights is provided. These lights are designated by reference numerals 146, 147, and 148 and these lights stay lighted until shifting has been effected. These lights are all connected to a common lead 149 which connects to common lead 112 of motor 106. Forward indicating light 146 is connected to the switch arm of forward switch 125 by a lead 150. Thus, when forward switch 125 is closed, light 146 is lit as soon as forward relay 120 has established a current through contact arm 117 and forward motor winding 110. When relay 120 is deenergized by reason of arm 99 striking limit switch 130, the electrical circuit through light 146 is broken and the operator then knows that he may remove his hand from forward switch 125 and that upon opening throttle 123 he will proceed in forward gear.

A lead 151 connects neutral light 147 to the switch arm of neutral switch 126, and neutral light 147 operates whenever motor 106 is operating to bring the unit into neutral but is extinguished the instant it comes into neutral. A lead 152 connects reverse light 148 to the switch arm of reverse switch 127, and reverse light 148 operates in the same manner as lights 146 and 147.

As a result of common lead 135 extending from neutral switch 126 to leads 144 and 136 and thence to switches 131 and 137 respectively, whenever neutral switch 126 is closed, the unit is brought from either reverse or forward into neutral by automaticaly rotating shaft 98 in the proper direction. This result follows because cam surface 140 of arm 99 closes switch 137 and allows switch 131 to be open when in forward and because it closes switch 131 and allows switch 137 to be open when arm 99 is in the reverse position. Switches 131 and 137 are so located that arm 99 is disposed between them so that neither of them is closed when arm 99 is in the neutral position. Switch 131 acts as a limit switch when going from reverse to neutral while switch 137 acts as a limit switch when going from forward to neutral. In this way, the control mechanism is very convenient in use and yet is economical to construct.

Limit switches 130 and 142 are mounted so as to be adjustable relative to arm 99 in order to compensate for clutch and brake wear.

The operation of the reversing unit and control therefor of the present invention has been described in detail above and therefore it is not deemed necessary at this point to reiterate the mode of operation.

If desired, a magnetic or other brake may be provided to stop the propeller shaft or to stop the rotation of shaft 19 whenever the mechanism is shifted to neutral gear.

I wish it to be understood that I desire to include as within my invention such modifications as may be necessary to adapt it to varying conditions and uses and as fall within the scope of the appended claims.

Having thus fully described my invention, what I claim as new and desire to secure by Letters Patent is:

1. In combination, a driving member, a driven member, a clutch between said driving and driven members, a reversing unit between said driving and driven members, said reversing unit comprising a brakable member and being operative to reversely drive said driven member when said brakable member is braked, means for braking said brakable member, common control means for operating said clutch and said braking means, and a reversible electric motor driving said control means, said control means when in one position engaging said clutch and disengaging said braking means, when in a second position disengaging both said clutch and said braking means and when in a third position disengaging said clutch and engaging said braking means, a first switch operating said motor to bring said control means into said first position, a second switch operating said motor to bring said control means into said second position, and a third switch operating said motor to bring said control means into said third position.

2. In combination, a driving member, a driven member, a clutch between said driving and driven members, a reversing unit between said driving and driven members, said reversing unit comprising a brakable member and being operative to reversely drive said driven member when said brakable member is braked, means for braking said brakable member, common control means for operating said clutch and said braking means, and a reversible electric motor driving said control means, said control means when in one position engaging said clutch and disengaging said braking means, when in a second position disengaging both said clutch and said braking means and when in a third position disengaging said clutch and engaging said braking means, a first switch operating said motor to bring said control means into said first position, a second switch operating said motor to bring said control means into said second position, and a third switch operating said motor to bring said control means into said third position, and limit switches in series with said second switch disposed so that both are open when said control means is in said second position and so that one of them is closed when said control means is in the first or third position.

3. In combination, a driving member, a driven member, a clutch between said driving and driven members, a reversing unit between said driving and driven members, said reversing unit comprising a brakable member and being operative to reversely drive said driven member when said brakable member is braked, means for braking said brakable member, common control means for operating said clutch and said braking means, and a reversible electric motor driving said control means, said control means when in one position engaging said clutch and disengaging said braking means, when in a second position disengaging both said clutch and said braking means and when in a third position disengaging said clutch and engaging said braking means, a first switch operating said motor to bring said control means into said first position, a second switch operation said motor to bring said control means into said second position, and a third switch operating said motor to bring said control means into said third position, a limit switch in series with said first switch operative to stop said motor when said control means has attained said first position and a limit switch in series with said third switch operative to stop said motor when said control means has attained said third position.

4. In combination, a driving member, a driven member, a clutch between said driving and driven members, a reversing unit between said driving and driven members, said reversing unit comprising a brakable member and being operative to reversely drive said driven member when said brakable member is braked, means for braking said brakable member, common control means for operating said clutch and said braking means, and a reversible electric motor driving said control means, said control means when in one position engaging said clutch and disengaging said braking means, when in a second position disengaging both said clutch and said braking means and when in a third position disengaging said clutch and engaging said braking means, a first switch operating said motor to bring said control means into said first position, a second switch operating said motor to bring said control means into said second position, and a third switch operating said motor to bring said control means into said third position, a pair of limit switches disposed in series with said second switch, each of said limit switches being open when said control means is in said second position and one of said switches being open and the other closed when said control means is in either the first or the third position, said limit switches being operative by being opened when said control means attains said second position to stop said control means in said second position, a limit switch in series with said first switch operative to stop said motor when said control means has attained said first position, and a limit switch in series with said third switch operative to stop said motor when said control means has attained said third position.

5. In combination, a driving member, a driven member, a clutch between said driving and driven members, a reversing unit between said driving and driven members, said reversing unit comprising a brakable member and being operative to reversely drive said driven member when said brakable member is braked, means for braking said brakable member, common control means for operating said clutch and said braking means, and a reversible electric motor driving said control means, said control means when in one position engaging said clutch and disengaging said braking means, when in a second position disengaging both said clutch and said braking means and when in a third position disengaging said clutch and engaging said braking means, a first switch operating said motor to bring said control means into said first position, a second switch operating said motor to bring said control means into said second position, and a third switch operating said motor to bring said control means into said third position, and a switch in series with each of said switches and being closed only when said driving means is idling whereby it is impossible to effect said selective control except when said driving means is idling.

ROBERT H. CLARKE.